US012633474B1

(12) United States Patent
Yang et al.

(10) Patent No.: US 12,633,474 B1
(45) Date of Patent: May 19, 2026

(54) KEYBOARD MODULE WITH LUMINOUS FUNCTION AND MEMBRANE CIRCUIT LUMINOUS STRUCTURE THEREOF

(71) Applicant: Primax Electronics Ltd.

(72) Inventors: Yu-Zeng Yang, Taipei (TW); Chin-Sung Pan, Taipei (TW); I-Hsiang Ko, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 19/317,260

(22) Filed: Sep. 3, 2025

(30) Foreign Application Priority Data

Jul. 21, 2025 (TW) ................................ 114127600

(51) Int. Cl.

| | |
|---|---|
| ***H01H 13/83*** | (2006.01) |
| ***F21V 23/00*** | (2015.01) |
| ***F21Y 113/13*** | (2016.01) |
| ***F21Y 115/10*** | (2016.01) |
| ***H01H 13/02*** | (2006.01) |
| ***H01H 13/703*** | (2006.01) |
| ***H01H 13/704*** | (2006.01) |

(52) U.S. Cl.
CPC ........... *H01H 13/83* (2013.01); *F21V 23/003* (2013.01); *H01H 13/023* (2013.01); *H01H 13/703* (2013.01); *H01H 13/704* (2013.01); *F21Y 2113/13* (2016.08); *F21Y 2115/10* (2016.08); *H01H 2219/016* (2013.01)

(58) Field of Classification Search
CPC ..... H01H 13/83; H01H 13/704; H01H 13/023
USPC ....................................................... 362/23.02
See application file for complete search history.

(56) References Cited

U.S. PATENT DOCUMENTS

| | | | | |
|---|---|---|---|---|
| 10,720,289 | B1 * | 7/2020 | Ho | H01H 13/704 |
| 2013/0229356 | A1 * | 9/2013 | Marwah | H01H 13/704 345/170 |
| 2014/0168934 | A1 * | 6/2014 | Chen | H01H 13/83 362/23.03 |
| 2021/0352786 | A1 * | 11/2021 | Lee | H05B 45/46 |
| 2023/0358944 | A1 * | 11/2023 | Liu | G02B 6/0021 |
| 2024/0321533 | A1 * | 9/2024 | Gadelle | G06F 3/0202 |

* cited by examiner

*Primary Examiner* — William N Harris
(74) *Attorney, Agent, or Firm* — KIRTON McCONKIE; Evan R. Witt

(57) ABSTRACT

A luminous keyboard and a membrane circuit luminous structure are provided. The membrane circuit luminous structure includes a first conductive layer, a second conductive layer and a plurality of IC-embedded luminous assemblies. When the first conductive layer and the second conductive layer are contacted with each other in response to a pressing action, the conduction between them is established. The plurality of IC-embedded luminous assemblies are installed on the second conductive layer. Each IC-embedded luminous assembly has a power terminal, a signal input terminal, a ground terminal and a signal output terminal. The power terminals are connected with each other in parallel. The ground terminals are connected with each other in parallel. The signal input terminals and the signal output terminals of the plurality of IC-embedded luminous assemblies are connected with each other in series to transmit signals.

16 Claims, 3 Drawing Sheets

KEYBOARD MODULE WITH LUMINOUS FUNCTION AND MEMBRANE CIRCUIT LUMINOUS STRUCTURE THEREOF

FIELD OF THE INVENTION

The present invention relates to a keyboard module with a luminous function and a membrane circuit luminous structure of the keyboard module, and more particularly to a keyboard module with a plurality of IC-embedded luminous assemblies and a membrane circuit luminous structure of the keyboard module.

BACKGROUND OF THE INVENTION

Nowadays, computers such as desktop computers (e.g., personal computers) or notebook computers become essential tools for modern people in their daily lives. Moreover, keyboards are important input devices for computers. Via the keyboards, users can input characters or perform control operations. Generally, a keyboard includes a plurality of keys. These keys are classified into some types, e.g., character keys, numeric keys and other associated function keys. For example, the keyboard has a specified key layout, e.g., a standard QWERTY layout. According to the key layout, these keys are located at specified positions on the keyboard.

Furthermore, with the advancement of the backlight technologies and in order to increase the application functions of keyboards, many keyboards are now designed with indicator lights or backlight elements with luminous functions. Structurally, in the keyboard with the luminous function, a conventional keyboard module and light-emitting elements are combined together. For example, in the direct-lit design, a light-emitting element such as a light-emitting diode (LED) is located under the keycap of the corresponding key. The keycap is made of a light-transmissible material. The light beam is generated under the keycap as a backlight source and transmitted out through the keycap. Consequently, the character printed on the keycap can be read more easily, or a special image effect is presented.

If the keys of this type of keyboard are traditional scissor-type keys, the indicator light is usually installed on a membrane circuit. That is, the current is conducted through the printed silver paste circuit to achieve the luminous function. However, due to the limitations of the internal structure of the keyboard and the need to form many holes in the membrane circuit to correspond to the keys, the wiring space of the circuit is very limited. Secondly, the conductivity of the silver paste printed circuit is worse than that of the copper foil substrate circuit made by embossing and etching. In addition, as the length of the trace increases, the impedance variability of the silver paste circuit will increase, which will cause the current to be unstable and affect the illumination of the indicator light.

As for the current technologies, the keyboards with key luminous functions generally use single-color LEDs as light-emitting elements, but there are also some keyboards that use colored LEDs. It is understandable that the wiring design of single-color light-emitting elements on the circuit board is relatively simple. In contrast, while the wiring design of color light-emitting elements such as the three primary colors of red, green and blue (RGB) LEDs is relatively complex. This is because each set of colored LEDs requires four wires, including a power line and three ground lines (one for each red, green and blue light-emitting element). For example, four sets of colored LEDs require 16 pins to be connected with the external controller.

Since the wiring design for each key in the keyboard is already quite complex, if each color light-emitting element can be controlled independently, the wiring inside the keyboard will increase significantly. If the keyboard uses a flat printed membrane circuit that cannot be designed with multiple layers or crosslines, the dense wiring structure will hardly provide additional space for the wiring design of the light-emitting elements. Even if a flexible printed circuit board (FPC) is used instead, it also needs to be designed with double-layer or multi-layer wiring structures, and the controller must be placed outside. Since additional conducting wires are required to connect the membrane circuit with the controller, the wiring complexity increases. Under this circumstance, the thickness, the durability and the assembling efficiency of the keyboard are affected, and the production cost increases.

Furthermore, due to the color mixing requirements, the demands on the brightness stability of the color light-emitting elements are increased to ensure consistent color mixing effects. If the impedance variability of the silver paste printed circuit is large, there will be a problem of current instability, which will make it impossible to accurately control the brightness of the red, green, and blue light-emitting diodes. This color mixing result may generate some drawbacks. For example, some areas are too bright or too dark. In other words, it is still difficult to install this type of indicator light on the traditional membrane circuit. Even if the product is made using the above method, its lighting effect is still very unstable.

Therefore, it is important to find a more ideal solution to overcome the above technical problems.

SUMMARY OF THE INVENTION

In order to overcome the drawbacks of the conventional technologies, the present invention provides a keyboard module with a luminous function and a membrane circuit luminous structure of the keyboard module. In the keyboard module and the membrane circuit luminous structure, IC-embedded luminous assemblies with respective built-in controllers are used. The built-in controller can be utilized to forward and relay the light control signal. Consequently, a simple circuit design is feasible to enable individual light control of each light-emitting element, and the problem of generating the unstable current is effectively solved.

In accordance with an aspect of the present invention, a membrane circuit luminous structure is provided. The membrane circuit luminous structure is installed in a keyboard module. The membrane circuit luminous structure includes a first conductive layer, a second conductive layer and a plurality of IC-embedded luminous assemblies. The first conductive layer formed by printing a conductive material. The second conductive layer is formed by printing the conductive material. The first conductive layer and the second conductive layer are separated from each other. When the first conductive layer and the second conductive layer are contacted with each other in response to a pressing action, a trigger signal is generated. The plurality of IC-embedded luminous assemblies are installed on the second conductive layer. The plurality of IC-embedded luminous assemblies have respective power terminals, respective signal input terminals, respective ground terminals and respective signal output terminals. The power terminals are connected with each other in parallel. The ground terminals are connected with each other in parallel. The signal input terminals and the signal output terminals of the plurality of IC-embedded luminous assemblies are connected with each other in series to transmit signals.

In accordance with another aspect of the present invention, a keyboard module with a luminous function is provided. The keyboard module includes a casing, a plurality of key structures and a membrane circuit luminous structure corresponding to the plurality of key structures. The plurality of key structures are installed on designated positions of the casing. The membrane circuit luminous structure is installed within the casing. The membrane circuit luminous structure includes a first conductive layer, a second conductive layer and a plurality of IC-embedded luminous assemblies. The first conductive layer formed by printing a conductive material. The second conductive layer is formed by printing the conductive material. The first conductive layer and the second conductive layer are separated from each other. When the first conductive layer and the second conductive layer are contacted with each other in response to a pressing action, a trigger signal is generated. The plurality of IC-embedded luminous assemblies are installed on the second conductive layer. The plurality of IC-embedded luminous assemblies have respective power terminals, respective signal input terminals, respective ground terminals and respective signal output terminals. The power terminals are connected with each other in parallel. The ground terminals are connected with each other in parallel. The signal input terminals and the signal output terminals of the plurality of IC-embedded luminous assemblies are connected with each other in series to transmit signals.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a keyboard module with a luminous function and a membrane circuit luminous structure of the keyboard module.

Figure 1:
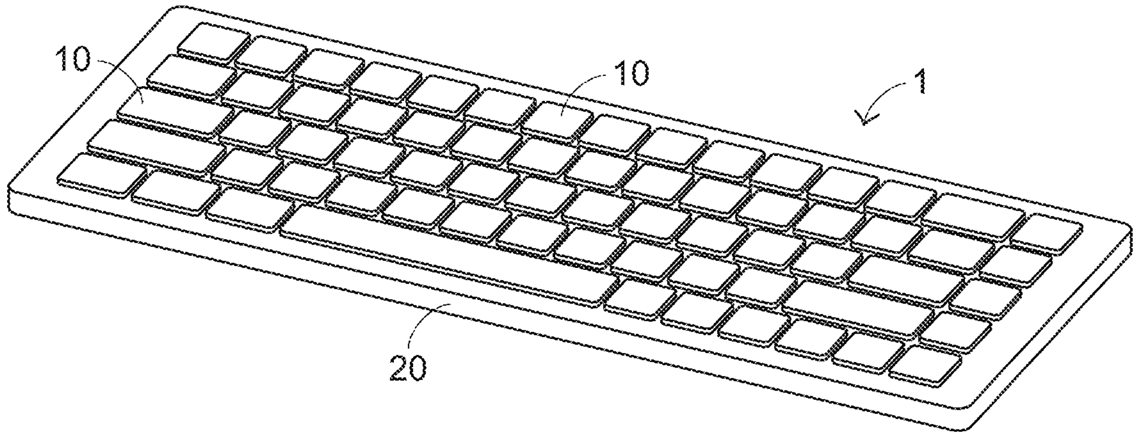
FIG. 1 is a schematic perspective view of a keyboard module according to an embodiment of the present invention.
Figure 2:
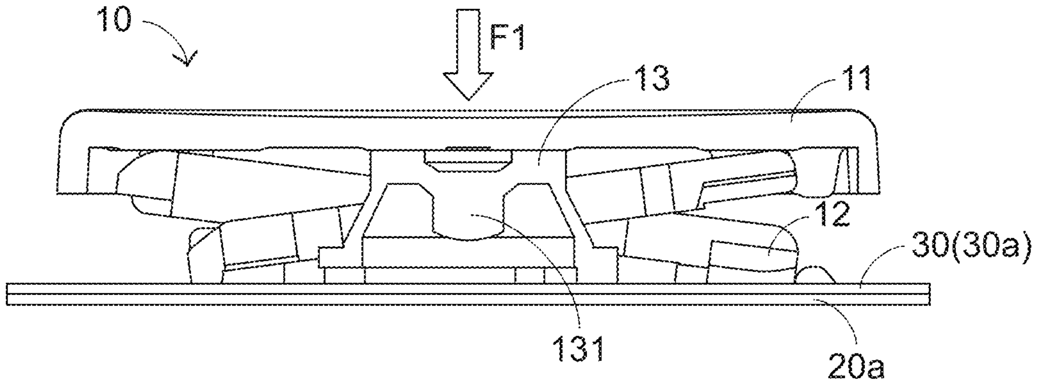
FIG. 2 is a schematic side cross-sectional view of a key structure and a membrane circuit luminous structure in the keyboard module shown in FIG. 1.
Figure 3:
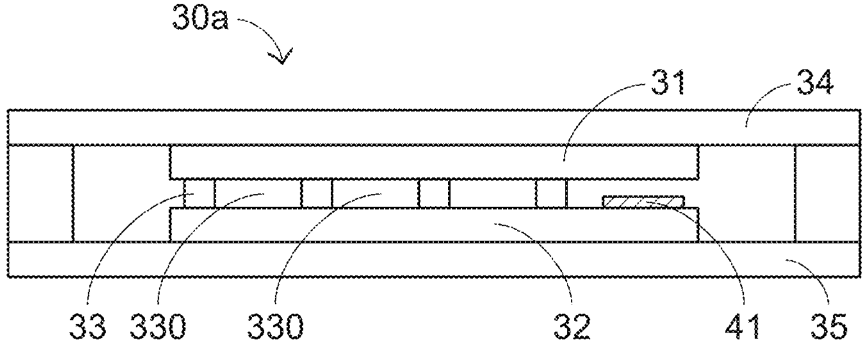
FIG. 3 is an enlarged side cross-sectional view of the membrane circuit luminous structure in the keyboard module of the present invention.

Please refer to FIGS. 1, 2 and 3. FIG. 1 is a schematic perspective view of a keyboard module 1 according to an embodiment of the present invention. FIG. 2 is a schematic side cross-sectional view of a key structure 10 and a membrane circuit luminous structure **30*a* in the keyboard module 1. FIG. 3 is an enlarged side cross-sectional view of the membrane circuit luminous structure 30*a***.

As shown in FIG. 1, the keyboard module 1 mainly includes a casing 20 and a plurality of key structures 10. Each key structure 10 can be located at a designated position on the casing 20 according to the character or function. The keyboard module 1 shown in FIG. 1 is an independent peripheral device for a desktop computer (or a personal computer (PC)). It is noted that the applications of the keyboard module 1 are not restricted. That is, the concepts of the keyboard module with the luminous function according to the present invention can also be applied to the keyboard and the key structure of a notebook computer.

As mentioned above, the keyboard module 1 of this embodiment is applied to a computer system (not shown). The computer system is a desktop computer or a laptop computer. The luminous function of the keyboard module 1 is the effect when the computer system operates and executes related applications or presents related statuses.

As shown in FIG. 2, the key structure 10 mainly includes a keycap 11, a scissor-type connecting structure 12 and a pressing element 13. In addition, a bottom plate **20*a* is a part of the casing 20. A membrane circuit 30 of the keyboard module 1 is arranged between the bottom plate 20*a* and the key structure 10. In accordance with a feature of the present invention, the membrane circuit luminous structure 30*a* is a part of the membrane circuit 30. That is, while the membrane circuit 30 is manufactured, the related wiring design of the membrane circuit luminous structure 30*a* is simultaneously completed by the same printing process. The membrane circuit luminous structure 30*a* is disposed within the casing 20 and aligned with the plurality of key structures 10**.

Secondly, the scissor-type connecting structure 12 is an X-structure assembly component that is widely used in the art, and the membrane circuit 30 has a related switching function. That is, the user can perform a pressing action F1 on the topmost keycap 11. Since the pressing force is evenly distributed by the underlying scissor-type connecting structure 12, a contact part 131 of the pressing element 13 with elasticity is moved downwardly to press the underlying membrane circuit 30 to achieve the circuit conduction. In FIG. 2, only one key structure of the keyboard module 1 is shown. Furthermore, the membrane circuit 30 includes a plurality of openings (not shown). These openings are aligned with the installation positions of the corresponding key structures 10. Consequently, the scissor-type connecting structure 12 can be penetrated through the corresponding openings and installed on the bottom plate **20*a***.

It is noted that the example of the scissor-type connecting structure 12 is not restricted. For example, when a flexible keyboard is adopted, the key structure 10 is not equipped with the scissor-type connecting structure 12.

As shown in FIG. 3, the membrane circuit luminous structure **30*a* includes a first conductive layer 31, a separation layer 33 and a second conductive layer 32. The separation layer 33 is arranged between the first conductive layer 31 and the second conductive layer 32 to support the overlying first conductive layer 31. Furthermore, in an unpressed state, the first conductive layer 31 and the second conductive layer 32 are separated from each other through the separation layer 33. In other words, when the pressing action F1 is not performed, the separation layer 33 with the non-conductive property can prevent the first conductive layer 31 and the second conductive layer 32** from contact and conduction between each other.

In accordance with the present invention, the membrane circuit luminous structure 30*a* further includes a plurality of IC-embedded luminous assemblies. For succinctness, only one IC-embedded luminous assembly is shown in the side view of FIG. 3.

As mentioned above, the membrane circuit 30 is manufactured by a printing process. That is, the first conductive layer 31 and the second conductive layer 32 are formed by printing a conductive material. For example, the conductive material is a conductive ink. In this embodiment, the conductive ink is silver paste. Furthermore, the length, the width and the thickness of the silver paste printed circuit are specially designed, and its composition and proportion are specially adjusted. Consequently, the upper limit of the circuit impedance value can be controlled, for example, about 10 ohms (52). It is noted that the examples of the conductive material are not restricted. For example, in another embodiment, the conductive ink is copper paste, carbon ink or solder paste.

Furthermore, the separation layer 33 has elastic properties, and the separation layer 33 is equipped with a plurality of vacant spaces 330. When the pressing action F1 is performed, the separation layer 33 can be correspondingly subjected to a compressive deformation, and thus the overlying first conductive layer 31 can be contacted with the underlying second conductive layer 32 through the vacant spaces 330. Consequently, the conduction between the first conductive layer 31 and the second conductive layer 32 is established, and a trigger signal is generated.

The membrane circuit luminous structure 30*a* further includes two protective layers 34 and 35. These two protective layers 34 and 35 are respectively disposed on the peripheries of the first conductive layer 31 and the second conductive layer 32 to cover the first conductive layer 31 and the second conductive layer 32. Preferably, each of the two protective layers 34 and 35 is made of a tough high-molecular polymer. For example, the tough high-molecular polymer is polyimide (PI), polyethylene terephthalate (PET), or a composite plastic material of polyimide (PI) and polyethylene terephthalate (PET). Consequently, when the force corresponding to the pressing action F1 is transmitted to the upper protective layer 34, the protective layer 34 with considerable hardness can produce a corresponding range of deformation to be pressed down while maintaining its general shape.

As mentioned above, the membrane circuit 30 includes a plurality of openings. In order to install the scissor-type connecting structure 12 on the bottom plate 20*a*, the openings of the membrane circuit 30 are formed in the corresponding locations of the two protective layers 34, 35, the first conductive layer 31 and the second conductive layer 32 for the lower part of the scissor-type connecting structure 12 to pass through.

In accordance with another feature of the present invention, the IC-embedded luminous assembly 41 is an IC-embedded RGB LED unit. That is, each IC-embedded luminous assembly 41 includes a built-in controller and three color light-emitting elements (see FIG. 4). In this embodiment, these color light-emitting elements are red, green and blue light emitting diodes, respectively. According to the current technology, the IC-embedded RGB LED unit has a single input/output pin with the ability to forward and relay signals.

In accordance with another feature of the present invention, each of the keycap 11 and the protective layer 34 is made of a material having a certain degree of light transmittance for allowing the membrane circuit luminous structure 30*a* to function smoothly. Furthermore, as shown in FIG. 3, the IC-embedded luminous assembly 41 is directly installed on the lower second conductive layer 32. Due to this design, the circuit and the power supply can be directly extended and connected to the outside. In FIG. 3, only one IC-embedded luminous assembly 41 is used as an example for illustration. It is noted that the number of the IC-embedded luminous assemblies and the number of the keycaps (i.e., the number of the key structures) are not necessarily in the one-to-one relationship. That is, the number of the IC-embedded luminous assemblies and the number of the keycaps may be determined according to the practical requirements.

Figure 4:
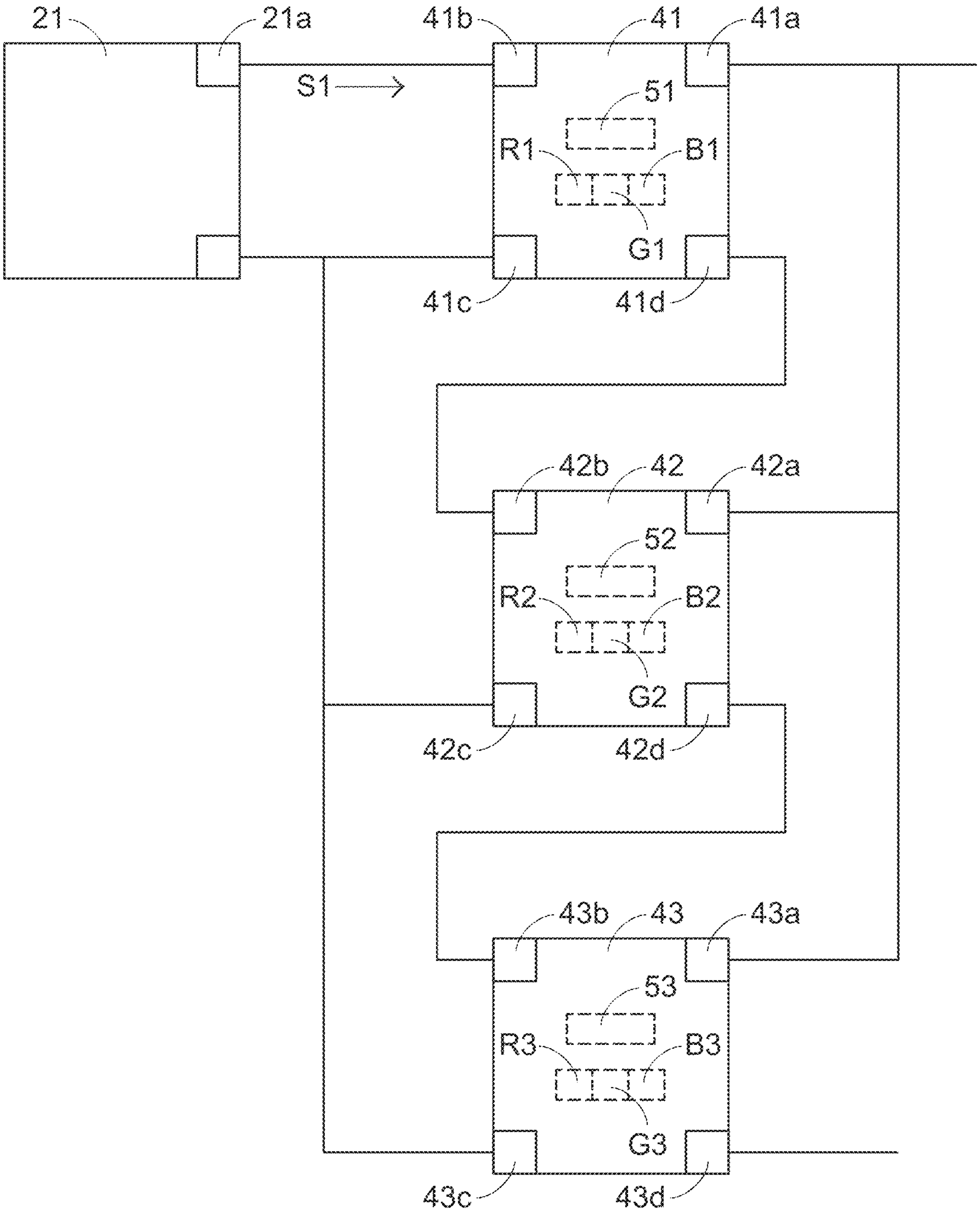
FIG. 4 is a schematic circuit diagram illustrating the circuitry structure of three IC-embedded luminous assemblies.

FIG. 4 is a schematic circuit diagram illustrating the circuitry structure of three IC-embedded luminous assemblies 41, 42 and 43. Each of the IC-embedded luminous assemblies 41, 42 and 43 includes a power terminal, a signal input terminal, a ground terminal and a signal output terminal. The power terminals of these IC-embedded luminous assemblies 41, 42 and 43 are connected with each other in parallel. The ground terminals of these IC-embedded luminous assemblies 41, 42 and 43 are connected with each other in parallel. Furthermore, the signal input terminals and the signal output terminals of these IC-embedded luminous assemblies 41, 42 and 43 are connected with each other in series to transmit signals.

In FIG. 4, three IC-embedded luminous assemblies 41, 42 and 43 are shown. Each three IC-embedded luminous assembly has four pins. That is, the IC-embedded luminous assembly 41 has a power terminal 41*a*, a signal input terminal 41*b*, a ground terminal 41*c* and a signal output terminal 41*d*, the IC-embedded luminous assembly 42 has a power terminal 42*a*, a signal input terminal 42*b*, a ground terminal 42*c* and a signal output terminal 42*d*, and the IC-embedded luminous assembly 43 has a power terminal 43*a*, a signal input terminal 43*b*, a ground terminal 43*c* and a signal output terminal 43*d*. The power terminals 41*a*, 42*a* and 43*a* are connected in parallel. The ground terminals 41*c*, 42*c* and 43*c* are connected in parallel. The signal output terminal 41*d* is electrically connected with the signal input terminal 42*b*. The signal output terminal 42*d* is electrically connected with the signal input terminal 43*b*. The signal output terminal 43*d* can be further electrically connected to a signal input terminal of a next IC-embedded luminous assembly (not shown). In other words, the IC-embedded luminous assemblies 41, 42 and 43 are serially connected as a series circuit. In the series circuit, the signal output terminal of each previous IC-embedded luminous assembly is electrically connected with the signal input terminal of the next IC-embedded luminous assembly.

As shown in FIG. 4, the keyboard module 1 is applied to a microprocessor 21. The microprocessor 21 can be a unit installed in the computer system and located outside the membrane circuit 30. A signal terminal 21*a* of the microprocessor 21 is electrically connected with only one of the IC-embedded luminous assemblies. In this embodiment, the signal terminal 21*a* of the microprocessor 21 only needs to be electrically connected with the signal input terminal 41*b* of the frontmost IC-embedded luminous assembly 41. In this way, the microprocessor 21 can generate a light control signal S1 to all IC-embedded luminous assemblies 41, 42 and 43. Consequently, the design complexity of the signal control circuit can be largely reduced. By means of the serial transmission circuit, the light control signal S1 can be successively transmitted to the next IC-embedded luminous assembly of the series circuit. In case that the computer system is a notebook computer with the keyboard module 1, the electrical connection between the signal terminal 21*a* and the signal input terminal 41*b* can be completed in the notebook computer. In case that the computer system is a desktop computer and the keyboard module 1 is an independent device, the electrical connection between the signal terminal 21*a* and the signal input terminal 41*b* is completed through the electrical connection between the desktop computer and the keyboard device.

Figure 5:
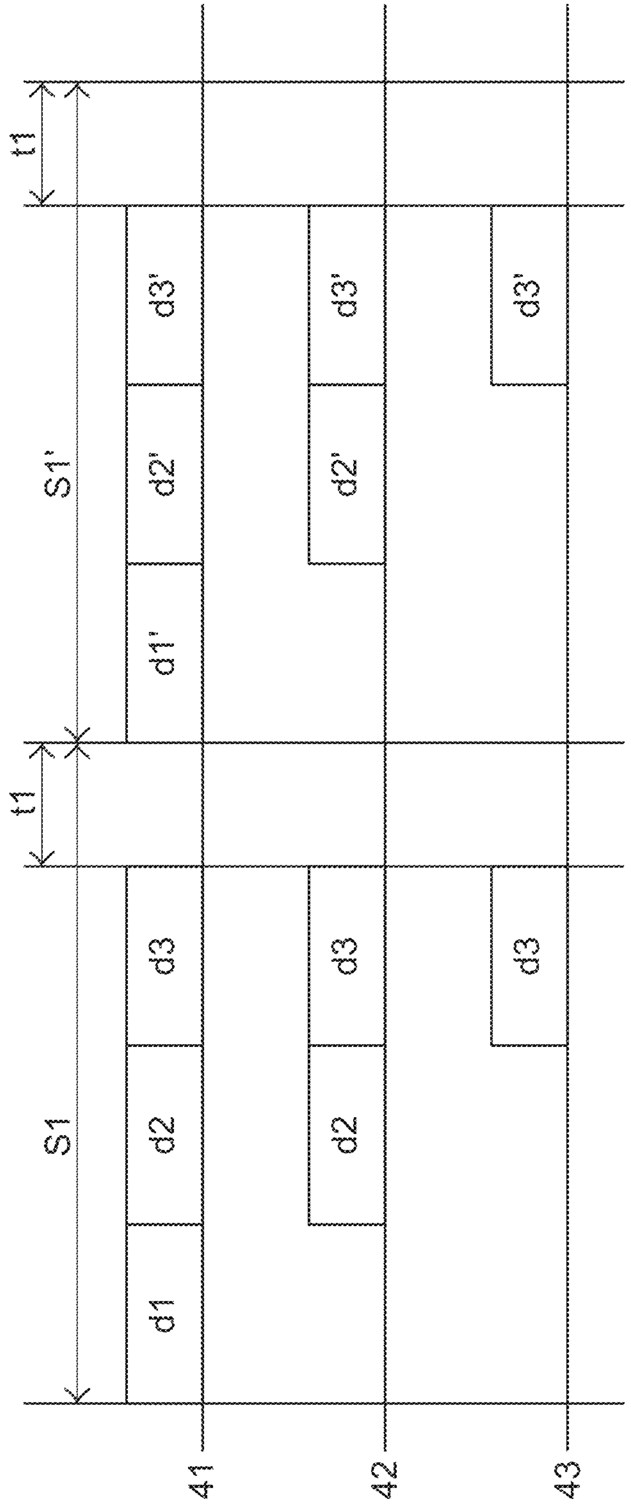
FIG. 5 schematically illustrates the contents of the light control signal corresponding to the IC-embedded luminous assemblies.

FIG. 5 schematically illustrates the contents of the light control signal corresponding to the IC-embedded luminous assemblies. As shown in FIG. 5, the data content of the light control signal S1 contains a plurality of partial data. In this embodiment, the light control signal S1 contains three partial data corresponding to the IC-embedded luminous assemblies 41, 42 and 43. The three partial data includes a first partial data d1, a second partial data d2 and a third partial data d3. In accordance with another feature of the present invention, the number of the partial data of the light control signal S1 corresponding to the IC-embedded luminous assemblies 41, 42 and 43 is related to the number of the IC-embedded luminous assemblies 41, 42 and 43. That is, the number of partial data of the light control signal S1 issued by the microprocessor 21 is determined according to the number of IC-embedded luminous assemblies in serial connection.

After the previous IC-embedded luminous assembly in the series circuit receives the light control signal S1 and reads the corresponding content of the light control signal S1, the light control signal S1 will be forwarded to the next IC-embedded luminous assembly. Please refer to FIGS. 4 and 5. After a built-in controller 51 of the IC-embedded luminous assembly 41 receives the light control signal S1 and reads out the first partial data d1, the first partial data d1 is the control content for the three color light-emitting elements R1, G1 and B1 of the IC-embedded luminous assembly 41. According to the first partial data d1, the built-in controller 51 controls the luminous function of the three color light-emitting elements R1, G1 and B1. Subsequently, the remaining part of the light control signal S1 is transmitted to the next IC-embedded luminous assembly 42.

Similarly, after a built-in controller 52 of the IC-embedded luminous assembly 42 receives the light control signal S1 and reads out the second partial data d2, the second partial data d2 is the control content for the three color light-emitting elements R2, G2 and B2 of the IC-embedded luminous assembly 42. According to the second partial data d2, the built-in controller 52 controls the illumination of the three color light-emitting elements R2, G2 and B2. Subsequently, the remaining part of the light control signal S1 is transmitted to the next IC-embedded luminous assembly 43.

Similarly, after a built-in controller 53 of the IC-embedded luminous assembly 43 receives the light control signal S1 and reads out the third partial data d3, the third partial data d3 is the control content for the three color light-emitting elements R3, G3 and B3 of the IC-embedded luminous assembly 43. According to the third partial data d3, the built-in controller 53 controls the illumination of the three color light-emitting elements R3, G3 and B3.

In this embodiment, only three IC-embedded luminous assemblies are connected in series in this embodiment. After the third partial data d3 is read out, the light control signal S1 has no remaining part. Consequently, the process of forwarding and relaying signals can be stopped.

In FIG. 5, another light control signal S1' is also shown. The light control signal S1' contains three partial data. The three partial data includes a first partial data d1', a second partial data d2' and a third partial data d3'. After the buffering of an idle time t1, the light control signal S1' following the light control signal S1 is issued by the microprocessor 21. Generally, the operation of the luminous function of the keyboard module 1 is usually related to a series of continuous phenomena. For example, the luminous function of the keyboard module 1 can be implemented to control which light-emitting elements to be illuminated or not, which light color to be illuminated, how long the light beams to be illuminated, or even how the intensities or colors of the light beams change. For example, the time duration including the idle time t1 may be set to 80 microseconds. This time duration is a data refresh cycle. That is, the time period of each light control signal is equal to one cycle. According to the practical requirements, the microprocessor 21 sends a series of light control signals. The method of reading out and forwarding each data is the same as described above.

As mentioned above, since the IC-embedded luminous assemblies with respective built-in controllers are used and connected as the series circuit, the printed wiring design of the membrane circuit becomes relatively simple. For example, the signal terminal 21*a* of the microprocessor 21 does not need to be electrically connected with all light-emitting elements. Especially, the signal terminal 21*a* of the microprocessor 21 only needs to be electrically connected with one of the IC-embedded luminous assemblies. As mentioned above, the microprocessor 21 can individually control the illumination of each light-emitting element through the built-in controllers 51, 52 and 53. However, since the IC-embedded luminous assemblies 41, 42 and 43 are connected in series, if only a portion of the red, green, and blue light emitting diodes need to be illuminated or changed, the content of the light control signal still contains the data of the light-emitting elements that are not illuminated or changed, but the data content maintains the status quo.

Due to the design of the series circuit, each of the built-in controllers 51, 52 and 53 in the IC-embedded luminous assemblies 41, 42 and 43 is driven by a constant current. In this way, the problem of generating the unstable current in the color light-emitting elements can be effectively solved, and the uneven brightness of the mixed light of the red, green and blue light-emitting diodes that causes some areas to be too bright or too dark will be avoided.

In other words, the membrane circuit luminous structure 30*a* of the present invention has the following characteristics. When the power provided by the keyboard module 1 is an input voltage, the operating voltage of each of the built-in controllers 51, 52 and 53 is lower than the input voltage minus the actual voltage drop of the second conductive layer 32.

As mentioned above, the IC-embedded luminous assemblies 41, 42 and 43 are installed on the second conductive layer 32, and the second conductive layer 32 is formed by printing a conductive ink. Consequently, the impedance value of the circuit may be altered according to the wiring design. In this embodiment, the upper limit of the impedance value can be controlled when the pattern of the silver paste printed circuit is specially designed. For example, in order to ensure that there is sufficient voltage to drive the operation of each of the built-in controllers 51, 52 and 53, the wire length is limited, the wire width is increased, the wire thickness is increased, and the resistivity of the conductive paste is reduced.

For example, it is assumed that the input voltage of the power supply is 5 volts (V), the printed wiring impedance of the second conductive layer 32 is 10 ohms (Ω), and the total current flowing through the second conductive layer 32 is 150 milliamperes (mA). Under this circumstance, the actual voltage drop across the second conductive layer 32 is 1.5 volts (V), i.e., 10 ohms (Ω)×0.15 amperes (A). Consequently, the input voltage minus the actual voltage drop of the second conductive layer 32 is 3.5 volts (V), i.e., 5 volts (V)-1.5 volts (V). Under these conditions, the operating voltage of the built-in controller cannot be greater than or exactly equal to 3.5 volts (V).

Some application scenarios of the membrane circuit luminous structure 30*a* of the present invention will be described as follows.

In a first scenario, the trigger signal generated after the user presses the keycap can be used as the start of the process, and thus the microprocessor 21 can issue the light control signal according to the trigger signal. For example, a certain key of the keyboard module 1 can be designed as a "luminous function start key". After the key is pressed, the luminous function of each light-emitting element is selectively enabled or disabled. Alternatively, whenever the user presses a key, the light-emitting element corresponding to the key will be turned on; and when the key is no longer pressed, the light-emitting element will be turned off.

In a second scenario, the luminous function of the keyboard module 1 is related to the execution of certain application programs by the computer system. Consequently, the user can store a user setting information in a memory unit of the computer system, and the microprocessor 21 can issue the light control signal according to the user setting information. For example, according to the user's settings, certain light-emitting elements will have corresponding brightness and darkness performances with the change of the volume of the loudspeaker when an audio and video multimedia program is executed. Consequently, the user's sound and light experience will be enhanced.

Similarly, in a third scenario, the luminous function of the keyboard module 1 is also related to the execution of certain application programs by the computer system. Consequently, when a related application program is executed, one or more light-emitting elements can be designated as the status indicator lights corresponding to the application program. In addition, the microprocessor 21 can issue the light control signal according to the execution status of the application program. For example, the artificial intelligence (AI) mode is an application program that requires a lot of computing time, and thus the user often performs other tasks when performing calculations in this mode. If certain light-emitting elements are designed to flash to represent that the calculation is still in progress, the user can clearly know the current status without having to switch between different windows.

From the above descriptions, the present invention provides a keyboard module with a luminous function and a membrane circuit luminous structure of the keyboard module. When compared with the conventional technologies, the keyboard module and the membrane circuit luminous structure of the present invention have the following features.

Firstly, the IC-embedded luminous assemblies with respective built-in controllers are adopted according to the technology of the present invention. The built-in controller can be utilized to forward and relay the light control signal. Consequently, a simple circuit design is feasible to enable individual light control of each light-emitting element.

Secondly, the membrane circuit and the IC-embedded luminous assemblies cooperate to achieve the luminous function. The plurality of IC-embedded luminous assemblies are arranged as a series circuit. In this way, the printed wiring design of the membrane circuit is relatively simple. Furthermore, since the luminous conditions of the red, green, and blue light-emitting diodes are not affected by variations in circuit impedance, the color mixing effect will be optimized.

Thirdly, the technology of the present invention improves the conventional membrane keyboard with the color luminous function, which can only use a complex circuit design of traditional light-emitting diodes in combination with an external controller. That is, with the performance of the IC-embedded luminous assemblies, the simple printed wiring design of the membrane circuit can also reduce the internal space of the mechanism. Consequently, the thickness of the keyboard will be reduced, and the manufacturing and maintenance costs of the product will be further reduced.

The technologies of the present invention can effectively solve the related problems existing in the prior art. Consequently, the main purpose of the present invention can be successfully achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A membrane circuit luminous structure installed in a keyboard module, the membrane circuit luminous structure comprising:

a first conductive layer formed by printing a conductive material;

a second conductive layer formed by printing the conductive material, wherein the first conductive layer and the second conductive layer are separated from each other, wherein when the first conductive layer and the second conductive layer are contacted with each other in response to a pressing action, a trigger signal is generated; and a plurality of IC-embedded luminous assemblies installed on the second conductive layer, wherein the plurality of IC-embedded luminous assemblies have respective power terminals, respective signal input terminals, respective ground terminals and respective signal output terminals, wherein the power terminals are connected with each other in parallel, the ground terminals are connected with each other in parallel, and the signal input terminals and the signal output terminals of the plurality of IC-embedded luminous assemblies are connected with each other in series to transmit signals.

2. The membrane circuit luminous structure according to claim 1, wherein the keyboard module comprises a plurality of key structures, and each of the first conductive layer and the second conductive layer has a plurality of openings, wherein positions of the plurality of openings are aligned with positions of corresponding key structures.

3. The membrane circuit luminous structure according to claim 1, wherein the membrane circuit luminous structure further comprises a separation layer, and the separation layer is arranged between the first conductive layer and the second conductive layer to support the first conductive layer, so that the first conductive layer and the second conductive layer are separated from each other through the separation layer, wherein when the pressing action is not performed, the separation layer prevents contact and conduction between the first conductive layer and the second conductive layer.

4. The membrane circuit luminous structure according to claim 1, wherein the conductive material is a conductive ink, and the conductive ink is silver paste, copper paste, carbon ink or solder paste.

5. The membrane circuit luminous structure according to claim 1, wherein the keyboard module is used with a microprocessor, and a signal terminal of the microprocessor is electrically connected with only one of the plurality of IC-embedded luminous assemblies, wherein the microprocessor issues a light control signal to the plurality of IC-embedded luminous assemblies.

6. The membrane circuit luminous structure according to claim 5, wherein the plurality of IC-embedded luminous assemblies are serially connected as a series circuit, wherein in the series circuit, the signal output terminal of a previous IC-embedded luminous assembly of the plurality of IC-embedded luminous assemblies is electrically connected with the signal input terminal of a next IC-embedded luminous assembly of the plurality of IC-embedded luminous assemblies, so that the light control signal is successively transmitted through the plurality of IC-embedded luminous assemblies.

7. The membrane circuit luminous structure according to claim 6, wherein after the previous IC-embedded luminous assembly in the series circuit receives the light control signal and reads a corresponding content of the light control signal, the light control signal is forwarded to the next IC-embedded luminous assembly.

8. The membrane circuit luminous structure according to claim 5, wherein each of the plurality of IC-embedded luminous assemblies comprises:

a built-in controller; and three color light-emitting elements, wherein the three color light-emitting elements include a red light emitting diode, a green light emitting diode and a blue light emitting diode, wherein the built-in controller receives and reads the light control signal, and the built-in controller controls a luminous function of the color light-emitting elements according to the light control signal.

9. The membrane circuit luminous structure according to claim 8, wherein when the keyboard module provides an input voltage, an operating voltage of the built-in controller is lower than the input voltage minus an actual voltage drop of the second conductive layer.

10. The membrane circuit luminous structure according to claim 5, wherein the microprocessor issues the light control signal according to the trigger signal.

11. The membrane circuit luminous structure according to claim 5, wherein the content of the light control signal contains a plurality of partial data, and a number of the partial data is related to a number of the plurality of IC-embedded luminous assemblies.

12. The membrane circuit luminous structure according to claim 5, wherein the keyboard module is used with a computer system, and the computer system comprises a memory unit and the microprocessor, wherein a user setting information is stored in the memory unit, and the microprocessor issues the light control signal according to the user setting information.

13. The membrane circuit luminous structure according to claim 5, wherein the keyboard module is used with a computer system, and the computer system executes an application program, wherein the microprocessor issues the light control signal according to an execution status of the application program.

14. The membrane circuit luminous structure according to claim 1, wherein the membrane circuit luminous structure further comprises two protective layers, wherein the two protective layers are respectively disposed on peripheries of the first conductive layer and the second conductive layer to cover the first conductive layer and the second conductive layer.

15. The membrane circuit luminous structure according to claim 14, wherein each of the protective layers is made of a tough high-molecular polymer, and the tough high-molecular polymer is polyimide (PI), polyethylene terephthalate (PET), or a composite plastic material of polyimide (PI) and polyethylene terephthalate (PET).

16. A keyboard module with a luminous function, the keyboard module comprising:

a casing;

a plurality of key structures installed on designated positions of the casing; and a membrane circuit luminous structure corresponding to the plurality of key structures, and installed within the casing, wherein the membrane circuit luminous structure comprises:

a first conductive layer formed by printing a conductive material;

a second conductive layer formed by printing the conductive material, wherein the first conductive layer and the second conductive layer are separated from each other, wherein when the first conductive layer and the second conductive layer are contacted with each other in response to a pressing action, a trigger signal is generated; and a plurality of IC-embedded luminous assemblies installed on the second conductive layer, wherein the plurality of IC-embedded luminous assemblies have respective power terminals, respective signal input terminals, respective ground terminals and respective signal output terminals, wherein the power terminals are connected with each other in parallel, the ground terminals are connected with each other in parallel, and the signal input terminals and the signal output terminals of the plurality of IC-embedded luminous assemblies are connected with each other in series to transmit signals.

* * * * *